United States Patent [19]

Nakajima et al.

[11] Patent Number: 5,743,559
[45] Date of Patent: Apr. 28, 1998

[54] INFLATOR FOR AIR BAGS

[75] Inventors: Yoshihiro Nakajima; Hidetoshi Ishida, both of Hyogo; Satoshi Sakamoto, Osaka, all of Japan

[73] Assignee: Daicel Chemical Industries, Ltd., Japan

[21] Appl. No.: 525,797

[22] PCT Filed: Jan. 27, 1995

[86] PCT No.: PCT/JP95/00099

§ 371 Date: Nov. 8, 1995

§ 102(e) Date: Nov. 8, 1995

[87] PCT Pub. No.: WO95/20508

PCT Pub. Date: Aug. 3, 1995

[30] Foreign Application Priority Data

Jan. 27, 1994 [JP] Japan .................... 6-007651

[51] Int. Cl.$^6$ ................ B60R 21/28; C06C 7/00
[52] U.S. Cl. ................ 280/741; 102/202; 102/288
[58] Field of Search ................ 280/736, 741; 102/530, 531, 202, 283, 288

[56] References Cited

U.S. PATENT DOCUMENTS

| 2,974,596 | 3/1961 | Allen ................ 102/202 |
| 3,211,097 | 10/1965 | Foote ................ 102/202.14 |
| 3,434,426 | 3/1969 | De Dapper ................ 102/202.8 |
| 3,899,973 | 8/1975 | Brocart ................ 102/202 |
| 4,109,578 | 8/1978 | Goetz ................ 280/741 |
| 4,296,284 | 10/1981 | Lott . | |
| 4,878,690 | 11/1989 | Cunningham ................ 280/741 |
| 4,890,860 | 1/1990 | Schneiter ................ 280/741 |
| 5,016,914 | 5/1991 | Faigle et al. ................ 280/741 |
| 5,062,367 | 11/1991 | Hayashi et al. . | |
| 5,109,772 | 5/1992 | Cunningham et al. ................ 280/741 |
| 5,213,362 | 5/1993 | Coultas ................ 280/741 |
| 5,345,872 | 9/1994 | Takahashi et al. ................ 280/741 |

FOREIGN PATENT DOCUMENTS

| 110642 | 8/1980 | Japan . |
| 176387 | 7/1988 | Japan . |
| 155858 | 6/1990 | Japan . |
| 75289 | 3/1991 | Japan . |
| 174210 | 7/1991 | Japan . |
| 85149 | 3/1992 | Japan . |
| 213148 | 8/1993 | Japan . |

Primary Examiner—Paul N. Dickson
Attorney, Agent, or Firm—Weingram & Associates, P.C.

[57] ABSTRACT

The inflator for air bags according to the present invention includes a cylindrical housing, an inner cylindrical member provided in the housing, a central cylindrical member provided in the inner cylindrical member, a gas generant packed in an annular space between the central cylindrical member and inner cylindrical member, and an ignition structure for igniting the gas generant. The ignition structure comprises booster charge provided in one end portion of the central cylindrical member, an igniter for igniting the booster charge, and a booster member provided in the part of the central portion of the central cylindrical member which is close to the booster charge, the booster member being made of a nonexplosive material so as to constitute a rod type member extending over substantially the whole length of the central cylindrical member. The ignition structure is capable of generating lengthwise uniform ignition energy.

15 Claims, 2 Drawing Sheets ced
5,743,559

INFLATOR FOR AIR BAGS

FIELD OF THE INVENTION

This invention relates to an inflator for an air bag which protects an occupant of a vehicle against an impact, and more particularly to an ignition means for the inflator.

The present invention provides a novel inflator for air bags which solves the problems encountered in the conventional techniques.

The inflator for air bags according to the present invention has a cylindrical housing provided with a gas outlet port, an inner cylindrical member provided in the housing and extending in the axial direction thereof so as to define a combustion chamber, a central cylindrical member provided in the inner cylindrical member and extending in the axial direction of the housing, a gas generant packed in an annular space formed between the central cylindrical member and inner cylindrical member, and an ignition means for igniting the gas generant, as generated by the gas generant on receiving an impact, the gas being introduced into an air bag to protect an occupant of a vehicle against the impact.

The invention is characterized in that the ignition means comprises a booster charge provided in one end portion of the central cylindrical member, an igniter for igniting the booster charge, and a booster member provided in the part of a central portion of the central cylindrical member which is close to the booster charge, the booster member being made of a nonexplosive material so as to constitute a rod type member extending over substantially the whole length of the central cylindrical member.

The ignition means in the inflator according to the present invention includes a booster member comprising a rod type member extending over substantially the whole length of the central cylindrical member. This booster member can be made of, for example, magnesium, polyfluorethylene such as TEFLON®, and a nonexplosive material containing VITON® as a main component. VITON® is the name of a commercial product of the E. I. du Pont de Nemours and Company. VITON® is a rubber-like copolymer containing fluorine atoms in the molecules. According to the present invention, ignition energy is generated by this booster member. Since this booster member is provided in the central portion of the central cylindrical member, an annular clearance is formed around the booster member. The flames of the booster charge pass through this clearance, whereby a circumferential portion of the booster member can be ignited over the whole length thereof substantially at the same time. Consequently, the booster member is burnt, and lengthwise uniform ignition energy is generated.

Since the inflator according to the present invention is constructed as described above, the effect which will be described below is obtained.

The booster member provided in this inflator can generate lengthwise uniform ignition energy. Therefore, the ignition of the gas generant is not limited to a certain region thereof but it is possible that the ignition thereof occurs in a wide region thereof at once. This enables the inflator to always display a stable gas generating capability.

Although the heating value of the booster member provided in this inflator is substantially equal to that of a generally used booster charge, the sensitivity of the former to heat and impacts is lower than that of the latter. Accordingly, the safety of the inflator with respect to the handling and manufacturing of the same is improved.

According to the present invention, an operation for manufacturing a tubular container which is difficult to manufacture due to its thin-walled elongated structure, and which is used to pack a booster charge therein, and an assembling operation for setting a booster charge and a detonating powder cord in the tubular container, which is very difficult and requires care, is not necessary to use. The inflator according to the present invention can be obtained by inserting a rod type booster member in a simply-formed central cylindrical member, and, the manufacturing and assembling of the parts of the inflator are carried out easily and safely.

Figure 1:
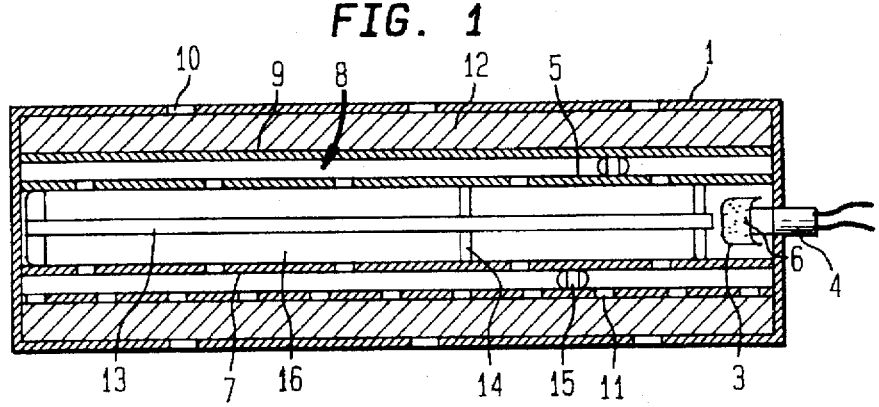
FIG. 1 is a sectional view of an inflator according to the present invention.

Referring to the drawings, reference numeral 1 denotes a housing, 4 an igniter, 5 a central cylindrical member, 6 a booster charge, 8 a combustion chamber, 9 a combustion cylinder (inner cylindrical member), 10 a gas outlet, 13 a booster member, 15 a gas generant, and 16 a clearance.

RELATED ART

A conventional inflator includes cylindrical housing having a gas outlet port, an inner cylindrical member provided in the housing and extending in the axial direction of the housing so as to define a combustion chamber, a gas generant packed in the combustion chamber, and an ignition means for igniting the gas generant.

Figure 8:
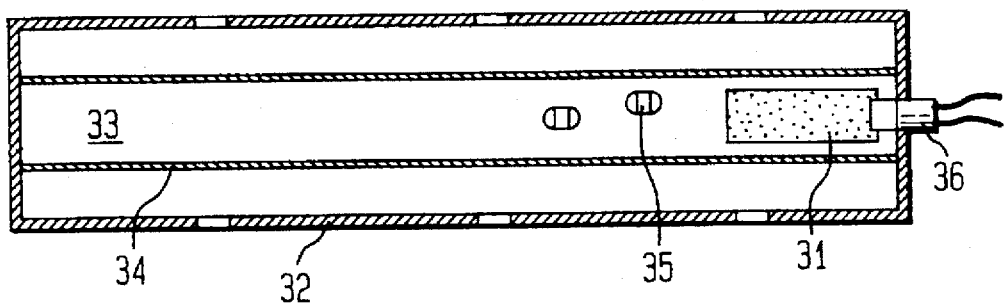
FIG. 8 is a sectional view of a conventional inflator.

FIG 8 shows an example in which booster charge 31 constituting an ignition means is provided on side of the interior of a cylindrical housing 32. The booster charge 31 is provided at one end portion of an inner cylindrical member 34 defining a combustion chamber 33. An igniter 36 is provided in contact with this booster charge 31. The combustion chamber 33 is filled with a gas generant 35.

An operation of the igniter 36 causes the booster charge 31 to be burnt, and the combustion of the booster charge 31 causes the gas generant 35 to be ignited.

Since the example of FIG. 8 is formed with the booster charge provided on one side of the interior of the housing, the ignition of the gas generant by the booster charge is limited to the portion of the burning gas generant which is around the booster charge.

Figure 9:
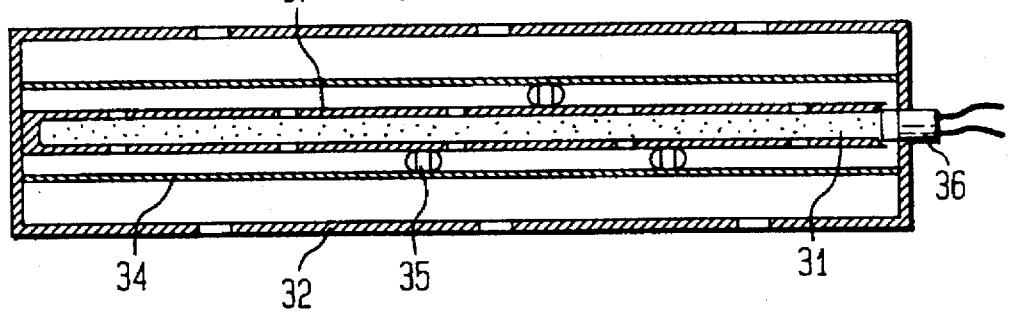
FIG. 9 is a sectional view of another conventional inflator.

An inflator, in which a region for providing booster charge extended in the axial direction as shown in FIG. 9 has been proposed. In this inflator, a central cylindrical member, i.e. a tubular container 37, which extends in the axial direction of a housing, is provided in an inner cylindrical member 34, and booster charge 31 is packed in the this tubular container 37. A gas generant 35 is packed in an annular space formed between the tubular container 37 and inner cylindrical member 34.

However, in this example, the combustion is transmitted from an end portion of the booster charge, so that it is impossible to generate ignition energy therein over the whole length thereof at once.

Figure 10:
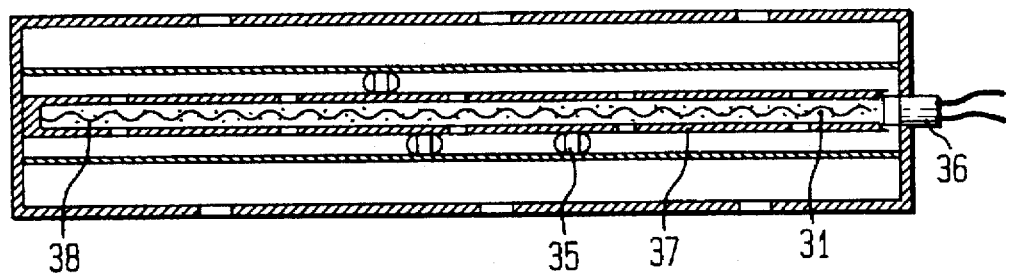
FIG 10 is sectional view of still another conventional inflator.

FIG. 10 shows an example formed by providing a structure, which is identical with that shown in FIG. 9, with a detonating, powder cord 38 in a tubular container 37 filled with booster charge 31, so as to solve this problem. Since the power cord is burnt very quickly as compared with the booster charge, the ignition energy can be generated therein over the whole length thereof substantially at the same time.

Since the inflator shown in FIG. 10 includes a booster charge, a tubular container filled with the booster charge, and a detonating powder cord provided in the tubular container, the construction thereof becomes complicated, and the assembling of the inflator is very difficult. The tubular container is an elongated container. In order to install the detonating powder cord in this tubular container, it is necessary that the detonating powder cord be placed in the central portion of the interior of the container first, and that the booster charge be then packed uniformly in the tubular container so that the detonating powder cord does not deviate from the central portion. These operations are very difficult, and have to be carried out carefully. Therefore, highly advanced techniques are required, and the inflator manufacturing operation takes much time and costs much money.

When an ignition operation is carried out with the detonating powder cord deviating from the central portion, uniform ignition energy cannot be obtained.

DETAILED DESCRIPTION OF THE PREFERRED EMBODIMENTS

An embodiment of the present invention will now be described with reference to the drawings. FIG. 1 is a sectional view of this inflator. This inflator has a cylindrical housing 1 with both ends closed. The housing has at an occupant-side region thereof a plurality of circular gas outlet ports 10 from which a combustion gas of a gas generant is discharged. The housing 1 is provided therein with an inner cylindrical member, i.e. a combustion cylinder 9. This combustion cylinder 9 has a cylindrical body, which is provided with axially spaced gas discharge holes 11 over the whole circumference thereof. This combustion cylinder 9 is provided coaxially with the housing 1 and extends up to both end portions thereof.

The combustion cylinder 9 is provided therein with a central cylindrical member 5 extending coaxially with and over the whole length of the combustion cylinder 9, and an annular combustion chamber 8 is formed between the central cylindrical member 5 and combustion cylinder 9. The combustion chamber 8 is filled with a gas generant 15 comprising a plurality of pellets, and a filler 12 is provided on the outer side of the combustion cylinder 9 so as to surround these pellets.

In one end portion of the central cylindrical member 5, an igniter 4 operated by a signal from a sensor (not shown), and booster charge 6 ignited by this igniter 4 are packed. The booster charge 6 is held in an booster charge container 3, and this booster charge container 3 and igniter 4 are in contact with each other. The central cylindrical member 5 is provided with a booster member 13 in the portion of the interior thereof which is close to the booster charge 6. The booster member 13 is formed the shape of a cross-sectionally circular rod, and provided in the central portion of the central cylindrical member 5, with the intermediate portion and both end portions thereof supported on a support member 14, the booster member 3 extending over substantially the whole length of the central cylindrical member 5. Between the booster member 13 and central cylindrical member 5, an annular clearance 16 is formed over the whole length of the booster member 13. This booster member 13 comprises magnesium, TEFLON® (a commercial product), and a nonexplosive material coating VITON® as a main component.

The central cylindrical member 5 is provided with a plurality of openings 7 from which the flames of the booster member 13 are ejected to the outside, and these openings 7 are formed in a uniformly distributed manner in the wall of the central cylindrical member.

The booster member sufficiently serves to achieve the object of the present invention even when it comprises a cross-sectionally circular rod. It is preferable that the booster member as a more complicated cross-sectional shape so as to increase the combustion speed and side surface area thereof. The booster member has, for example, a hollow and radially extending projections.

Figure 2:
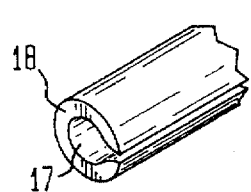
FIG. 2 is a partial perspective view of a booster member used with this inflator.
Figure 5:
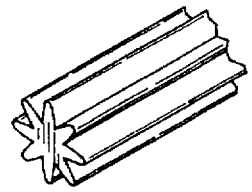
FIG. 5 is a partial perspective view of a similar portion of a further embodiment of the booster member.
Figure 3:
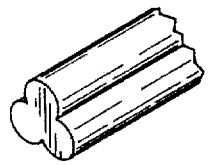
FIG. 3 is a partial perspective view of a similar portion of another embodiment of the booster member.
Figure 6:
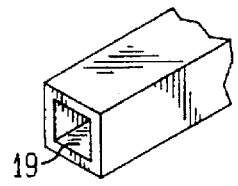
FIG. 6 is a partial perspective view of a similar portion of another embodiment of the booster member.
Figure 4:
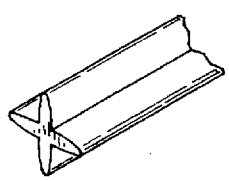
FIG. 4 is a partial perspective view of a similar portion of still another embodiment of the booster member.
Figure 7:
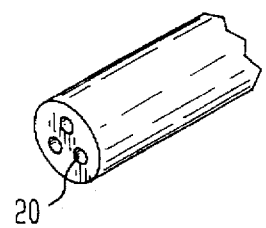
FIG. 7 is a partial perspective view of a similar portion of still another embodiment of the booster member.

FIGS. 2–7 show various shapes of booster members applicable to the inflator according to the present invention. FIG. 2 shows an example capable of being burnt from both the inner and outer surfaces 17, 18, respectively, thereof. FIGS. 3–5 show shaped examples having an increased surface area. FIGS. 6 and 7 show examples in which flame passages 19, 20, respectively, are formed inside so that the booster members can be burnt from the inner side thereof as well.

When an impact is detected by a sensor, a signal representative of the same is sent to the igniter 4, so that the igniter 4 is operated, whereby the booster charge 6 is ignited to generate high-temperature flames. The flames pass through the clearance 16 formed around the other circumference of the booster member 13, and ignite the outer circumference of the booster member 13 over the whole length thereof substantially at the same time. Consequently, the booster member 13 is burnt and lengthwise uniform ignition energy is generated. This ignition energy is ejected from the openings 7 of the central cylindrical member 5 to ignite the portions of the gas generant which are in the regions corresponding to the openings 7. As a result, the gas generant 15 is burnt to generate a high-pressure combustion gas. This combustion gas flows into a filter chamber through the openings 11, and, while the combustion gas passes through the filter 12, the combustion residue is removed. The gas ejected from the gas outlet port flows into an air bag (not shown), which expands suddenly so as to protect an occupant of a vehicle against the impact.

We claim:

1. An inflator for air bags, comprising;
   a first housing having first gas ports formed therein;
   a second housing having second gas ports formed therein, the second housing disposed within the first housing;
   a third housing having third gas ports formed therein, the third housing disposed within the second housing; a gas generant disposed between the second housing and the third housing; and
   an ignition assembly for igniting the gas generant, the ignition assembly comprising:

a charge disposed at an end of the third housing, an igniter for igniting the charge, and a booster rod formed from non-explosive material extending from a position near the charge along substantially an entire length of the third housing, the booster rod spaced apart from the third housing and having at least one hollow formed substantially along a length thereof, the booster rod comprising magnesium, polytetrafluoroethylene, and a fluororubber copolymer; and a filter member disposed in a space between the first and second housings.

2. An inflator for air bags, comprising:

a first housing having first gas ports formed therein;

a second housing disposed within the first housing and having second gas ports formed therein;

a gas generant disposed between the first housing and the second housing;

an ignition assembly associated with an end portion of the second housing;

a solid booster rod formed from non-explosive material extending from a position near the ignition assembly along substantially an entire length of the second housing; and at least one support member disposed within the second housing for supporting the booster rod.

3. The inflator according to claim 2, wherein the booster rod is disposed at an interior of the second housing and spaced apart from the second housing.

4. The inflator according to claim 3, wherein the booster rod comprises:

magnesium, polytetrafluoroethylene, and a fluororubber copolymer.

5. The inflator according to claim 3, wherein the booster rod comprises:

magnesium, polyfluorethylene, and a fluororubber copolymer.

6. The inflator according to claim 2, wherein the booster rod comprises:

at least one hollow extending substantially along a length of the booster rod.

7. The inflator according to claim 2, wherein the booster rod comprises:

radially extending projections.

8. The inflator according to claim 7, wherein the radially extending projections extend substantially along a length of the booster rod.

9. The inflator according to claim 2, further comprising:

a third housing disposed within the first housing and constructed and arranged to receive the second housing, the third housing spaced apart from the first housing and the second housing for providing a space between the second housing and the third housing;

wherein the gas generant is disposed in the space between the second and third housings.

10. The inflator according to claim 9, further comprising:

a filter member disposed in a space between the first housing and the third housing.

11. The inflator according to claim 9, wherein the first, second and third housings are coaxial.

12. The inflator according to claim 9, wherein the booster rod is coaxial with at least the second housing.

13. The inflator according to claim 2, wherein the at least one support member is constructed and arranged in the second housing for supporting opposed ends and an intermediate portion of the booster rod.

14. The inflator according to claim 2, wherein the second gas ports are uniformly distributed over the second housing.

15. An inflator for air bags comprising:

a first housing having first gas ports formed therein;

a second housing disposed within the first housing and having second gas ports formed therein;

a gas generant disposed between the first housing and the second housing;

an ignition assembly associated with an end portion of the second housing;

a booster rod formed from non-explosive material extending from a position near the ignition assembly along substantially an entire length of the second housing; and a support assembly constructed and arranged in the second housing for supporting opposed ends and an intermediate portion of the booster rod.

* * * * *